United States Patent
Lavrov et al.

(10) Patent No.: US 9,063,779 B2
(45) Date of Patent: Jun. 23, 2015

(54) TASK LIST GENERATION, PARALLELISM TEMPLATES, AND MEMORY MANAGEMENT FOR MULTI-CORE SYSTEMS

(75) Inventors: Nick J. Lavrov, Aliso Viego, CA (US); Nour Toukmaji, Irvine, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 1189 days.

(21) Appl. No.: 12/655,786

(22) Filed: Jan. 6, 2010

(65) Prior Publication Data
US 2011/0167245 A1    Jul. 7, 2011

(51) Int. Cl.
G06F 9/46    (2006.01)
G06F 9/48    (2006.01)

(52) U.S. Cl.
CPC .................................. *G06F 9/4881* (2013.01)

(58) Field of Classification Search
None
See application file for complete search history.

(56) References Cited

U.S. PATENT DOCUMENTS

| | | | | |
|---|---|---|---|---|
| 6,381,610 | B1 * | 4/2002 | Gundewar et al. | 1/1 |
| 2007/0106987 | A1 * | 5/2007 | Makino | 718/100 |
| 2008/0313281 | A1 * | 12/2008 | Scheidl et al. | 709/205 |
| 2009/0089785 | A1 | 4/2009 | Marwinski | |

OTHER PUBLICATIONS

F. Song, et al: "Dynamic task scheduling for linear algebra algorithms on distributed-memory multicore systems", Proceedings of the Conference on High Performance Computing Networking, Storage and Analysis, SC '09, Nov. 14, 2009-Nov. 20, 2009, 11 Pages.
Young Choon Lee, et al: "Practical Scheduling of Bag-of-Tasks Applications on Grids with Dynamic Resilience" IEEE Transactions on Computers, IEEE, US, vol. 37, No. 6, Jun. 1, 2007, 11 Pages.
Yinglong Xia, et al: "Parallel Evidence Propagation on Multicore Processors", Aug. 31, 2009, Parallel Computing Technologies, Springer Berlin Heidelberg, Berlin, Heidelberg, pp. 377-391, PaCT 2009, Novosibirsk, Russia.

* cited by examiner

*Primary Examiner* — Gregory A Kessler
(74) *Attorney, Agent, or Firm* — Farjami & Farjami LLP

(57) ABSTRACT

There is provided a multi-core system that provides automated task list generation, parallelism templates, and memory management. By constructing, profiling, and analyzing a sequential list of functions to be executed in a parallel fashion, corresponding parallel execution templates may be stored for future lookup in a database. A processor may then select a subset of functions from the sequential list of functions based on input data, select a template from the template database based on particular matching criteria such as high-level task parameters, finalize the template by resolving pointers and adding or removing transaction control blocks, and forward the resulting optimized task list to a scheduler for distribution to multiple slave processing cores. The processor may also analyze data dependencies between tasks to consolidate tasks working on the same data to a single core, thereby implementing memory management and efficient memory locality.

20 Claims, 3 Drawing Sheets

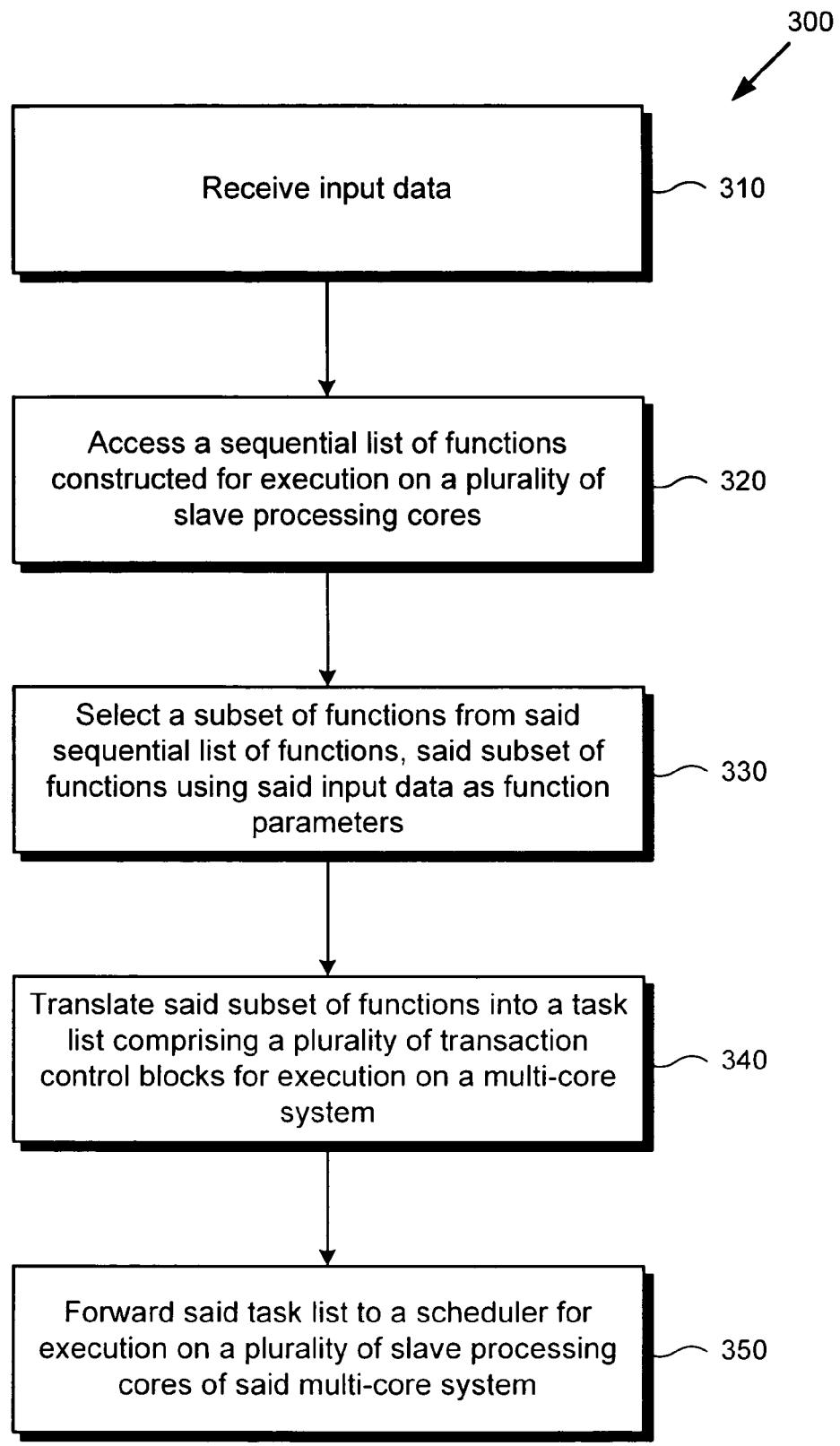

TASK LIST GENERATION, PARALLELISM TEMPLATES, AND MEMORY MANAGEMENT FOR MULTI-CORE SYSTEMS

BACKGROUND OF THE INVENTION

1. Field of the Invention

The present invention relates generally to processing systems, and more specifically to multi-core processing systems.

2. Background Art

In the past, increasing performance in processing-intensive electronic devices, such as base transceiver stations and other types of communications devices, could be achieved merely by increasing the processor clock speed of the devices. However, the introduction of applications requiring very fast processing performance to meet application latency requirements, such as Voice over Internet Protocol (VoIP), video conferencing, multimedia streaming, and other real-time applications have rendered this simple approach as no longer practical. As a result, the use of multi-core systems has become a popular approach for increasing performance in processing-intensive electronic devices, such as base station transceivers. To realize the potential increase in performance that multiple processing cores can provide, however, each processing core needs to be programmed so that the processing workload is appropriately divided over all of the processing cores.

However, programming multiple processing cores can be significantly more complicated than programming a single core, placing a heavy burden on programmers. To avoid this burden, many software development paradigms are still focused on sequentially organized single-core applications. As a result, development tools are often not well suited to programming for multi-core systems. In order to efficiently utilize multiple cores, programmers have thus been traditionally required to understand the low-level hardware implementation details for the multi-core system to be programmed, manually specifying intra-core communication, task delegation, and other hardware details. Programmers may find it difficult to adhere to application development budgets and schedules with this extra burden, leading to software applications that may be poorly optimized for use on multi-core hardware systems.

Accordingly, there is a need in the art for a multi-core system that can effectively address the aforementioned difficulty of programming, facilitating development and optimizing of software for multi-core systems.

SUMMARY OF THE INVENTION

There is provided a multi-core system with automated task list generation, parallelism templates, and memory management, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 3 is a flowchart presenting a method of generating a task list comprising a plurality of transaction control blocks for execution on a multi-core system, according to one embodiment of the present invention.

DETAILED DESCRIPTION OF THE INVENTION

Figure 1:
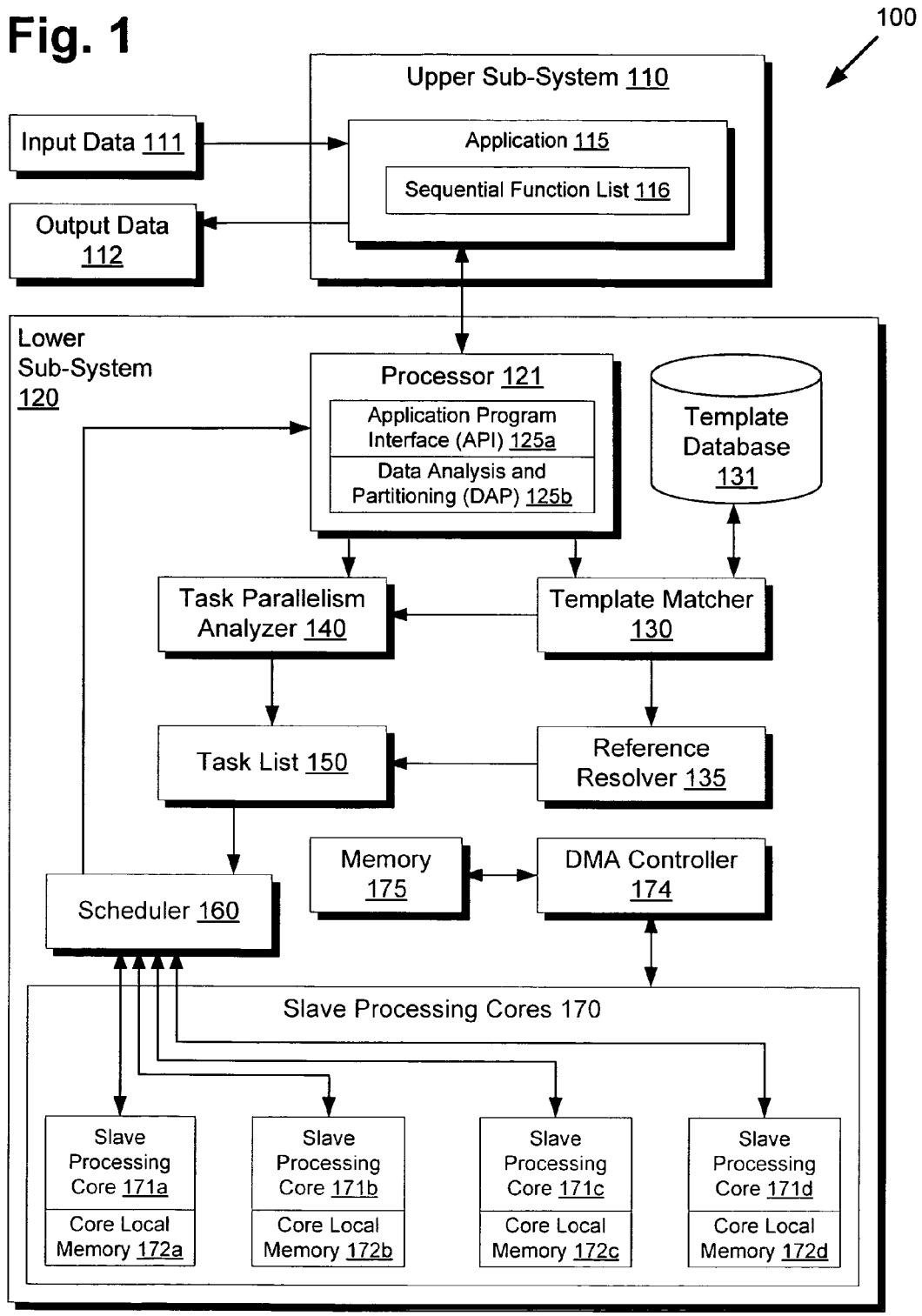
FIG. 1 shows a diagram of an exemplary multi-core system, according to one embodiment of the present invention.

Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art. The drawings in the present application and their accompanying detailed description are directed to merely example embodiments of the invention. To maintain brevity, other embodiments of the invention which use the principles of the present invention are not specifically described in the present application and are not specifically illustrated by the present drawings. It should be borne in mind that, unless noted otherwise, like or corresponding elements among the figures may be indicated by like or corresponding reference numerals.

FIG. 1 shows a diagram of an exemplary multi-core system, according to one embodiment of the present invention. Multi-core system 100 of FIG. 1 includes upper sub-system 110 containing application 115, which includes a sequential function list 116. Application 115 may be executing on an upper processor (not shown), which may also execute an operating system and operating system programs. Application 115 may be written to process input data 111, which may be updated in real-time. Input data 111 may be received from, for example, an Ethernet network interface. Upon processing of input data 111, output data 112 may be generated and sent through another interface, such as a radio broadcast interface. Thus, an example application 115 may receive input data 111 as a digitized voice stream for encoding to output data 112 as a compressed and encrypted data stream for transmission via a wireless radio broadcast.

As shown in FIG. 1, upper sub-system 110 is in communication with processor 121 of lower sub-system 120 through application program interface (API) 125a and data analysis and partitioning (DAP) 125b, which provide well-defined communication protocols for exchanging data between the upper and lower sub-systems. Using API 125a, application 115 can pass sequential function list 116 for execution on lower sub-system 120. The contents of sequential function list 116 may be constructed depending on the tasks necessary to execute on input data 111, which may change in real-time. After such data-driven construction, sequential function list 116 may be passed to template matcher 130 for matching against template database 131, or passed to task parallelism analyzer 140 for full parallelism analysis from scratch. Template database 131 may contain a collection of pre-optimized task list templates, allowing template matcher 130 to create an optimal task list 150 much faster than using task parallelism analyzer 140. Since template database 131 only contains template task lists, a matched template may be passed to reference resolver 135 to finalize data pointers in the matched template. Reference resolver 135 may also add additional tasks or remove tasks as necessary. If template matcher 130 is unable to find a suitable template, then it may fail-safe back to task parallelism analyzer 140 for full analysis from scratch. In either case, the result is an optimized task list 150 containing a list of transaction control blocks, which may then optionally be converted into a template and stored within template database 131 for future reference. Task list 150 may then be passed to scheduler 160, which can then distribute the transaction control blocks of task list 150 to slave processing cores 170 for execution. As shown in FIG. 1, slave processing cores 170 include slave processing cores 171*a*-171*d*, each having a respective core local memory 172*a*-172*d* and access to a shared memory 175 via Direct Memory Access (DMA) controller 174.

While only four slave processing cores are shown in FIG. 1, alternative embodiments may use any number of slave processing cores. Additionally, each slave processing core may be of the same architectural type, such as an individual core of a multi-core embedded processor, or of different architectural types. For example, slave processing core 171*a* could comprise a specialized custom digital signal processor (DSP), slave processing core 171*b* could comprise a general DSP, and slave processing cores 171*c*-171*d* could comprise individual cores of a dual-core embedded processor. Furthermore, as the diagram shown in FIG. 1 is presented as a high level overview, implementation details have been simplified or omitted for reasons of clarity.

Figure 2:
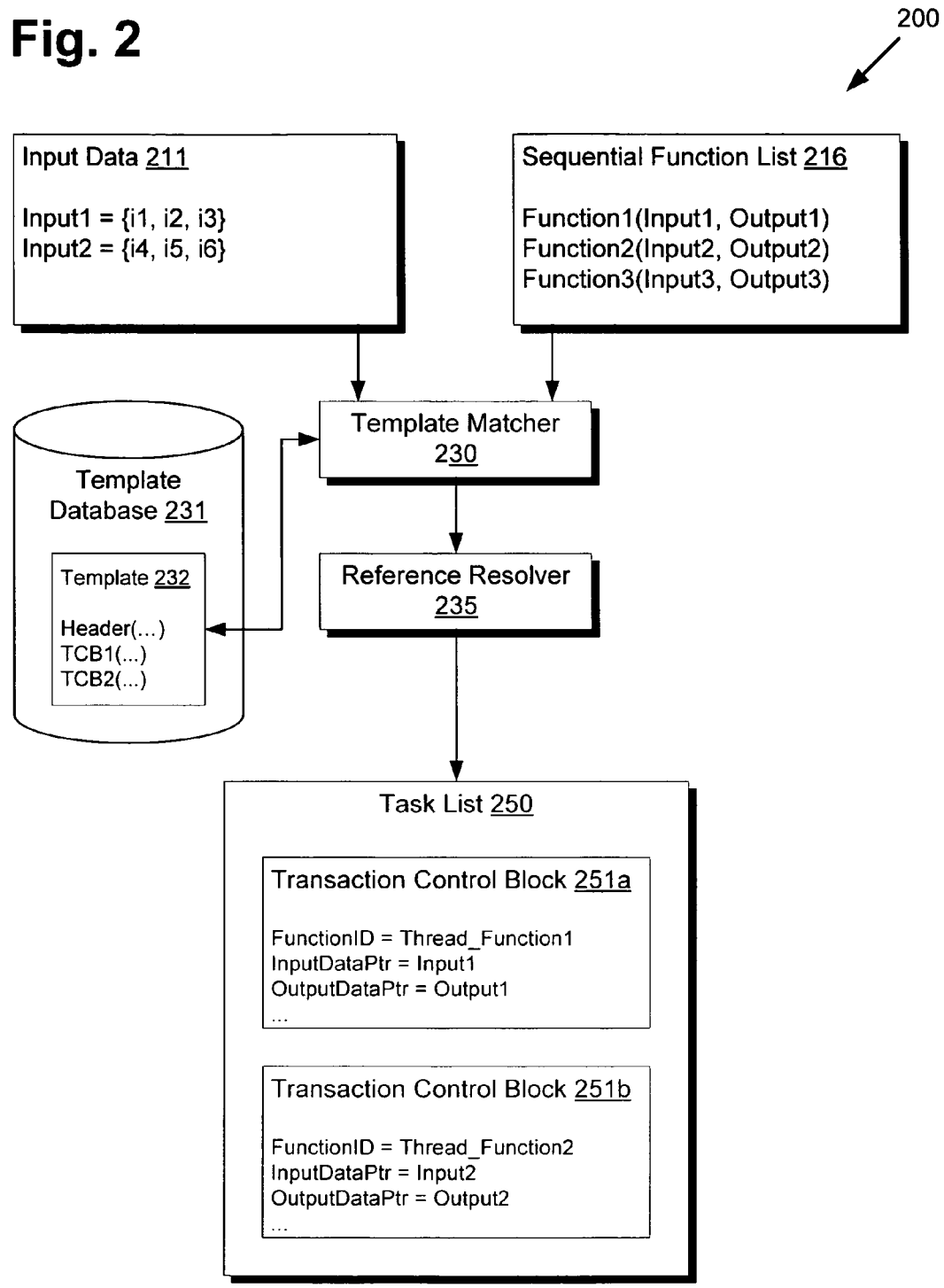
FIG. 2 shows a diagram showing the generation of a task list, according to one embodiment of the present invention.

Moving to FIG. 2, FIG. 2 shows a diagram showing the generation of a task list, according to one embodiment of the present invention. Diagram 200 of FIG. 2 includes input data 211 containing the inputs as shown, with Input1 including {i1, i2, i3} and Input2 including {i4, i5, i6}. Input data 211 may be updated in real-time, varying in size and number of inputs to reflect changing user workloads and load patterns. Function1, Function2, and Function3 in sequential function list 216 are thus programmed to process input data 211.

While sequential function list 216 may be constructed and executed sequentially on a single slave processing core, this represents a non-optimal use of multi-core processing resources, especially if no other execution threads are active. Additionally, a single slave processing core may not have enough processing cycles available to meet required real-time data processing deadlines. For example, if audio processing is not expedited in a timely fashion, buffer underruns may occur, causing audio stuttering and artifacts that negatively impact the end user experience.

Thus, sequential function list 216 may be constructed, traced and analyzed in advance for optimal multi-core execution on lower sub-system 120. Certain function tasks may be given higher processing priorities than others. For example, audio processing may be given high priority due to human sensitivity to audio defects, but video processing may be given less priority since minor visual defects may be better tolerated. Similarly, some applications such as real-time conferencing may require low latency and thus be assigned high priority, while other applications may tolerate large delays without significant ill effects and thus be assigned lower priority. Once sequential function list 216 is thus optimized, corresponding parallel execution templates can be created for template database 231. In this manner, template matcher 230 can recognize defined configurations of sequential function list 216 and provide an appropriate template from template database 231 that allows optimal multi-core execution appropriate for the application at hand, avoiding the need for a full parallelism analysis that may be difficult to timely complete while concurrently processing a real-time workload.

Returning to the example input data 211 shown in FIG. 2, template matcher 230 may determine that Function3 is not necessary for execution since Input3 is empty or unavailable at the present time. Thus, only Function1 and Function2 may be selected. Since Function1 and Function2 are operating on independent data, there are no data dependencies requiring in-order execution and thus Function1 and Function2 can be executed in parallel and/or out-of-order. Thus, a preliminary ordered function list may include Function1 then Function2 or Function2 then Function1. To match against a template in template database 231, template matcher 230 may use certain high-level task parameters, such as the size or number of inputs or type of task. For example, template matcher 230 may see that Input1 and Input2 each reference three data streams or {i1, i2, i3} and {i4, i5, i6} respectively, which may be defined to be audio streams of a known bit-rate. This information may be embedded as high-level data descriptors within the Header section of template 232, which can then be searched and matched by template matcher 230. As shown in template 232, a task list containing two transaction control blocks (TCBs) is included in template 232, but with empty data references to be filled by reference resolver 235. Reference resolver 235 may make the necessary modifications to TCB1 and TCB2 such that data pointers are correctly set to Input1, Input2, Output1, and Output2. Additionally, as previously discussed, reference resolver 235 may add, remove, and adjust TCBs as necessary if the retrieved template does not exactly align with the operations specified by sequential function list 216 and input data 211.

While Function1 and Function2 operate on independent data in FIG. 2, alternative embodiments may include sequential function lists where the output of one function is used as the input of another function, or other shared data dependencies. In this case, depending on the size of data being processed, it may be advantageous to consolidate transaction control blocks into one large block for execution sequentially on a single core so that data may remain in one of core local memory 172*a*-172*d*. This memory management reduces the number of memory transfers required between memory 175 and core local memory 172*a*-172*d* via DMA controller 174, leading to faster processing. Thus, reference resolver 235 may consolidate one or more groups of transaction control blocks based on data dependencies and whether the data workloads can fit within a given core local memory size. Scheduler 160 is therefore prevented from splitting the consolidated workload across different cores, reducing unnecessary transfers between memory 175 and core local memory 172*a*-172*d*.

After finalization by reference resolver 235, the end result is an optimized task list 250, with transaction control blocks 251*a*-251*b* as shown. Since the optimization shown in FIG. 2 is by selecting a closest matching pre-optimized template and performing adjustments as necessary, the resulting optimization may not be most efficient possible. However, since template lookup and adjustment incurs only a small real-time processing penalty compared to full parallelism analysis, a high level of processing efficiency may be achieved for optimization. This is of particular benefit for real-time applications having limited resources to allocate for parallelism analysis.

As previously discussed, since sequential function list 216 is constructed to execute on lower sub-system 120 as part of the preparatory parallelism analysis, a lower sub-system 120 native Thread_Function1 corresponding to Function1 and a lower sub-system 120 native Thread_Function2 corresponding to Function2 may be accessible for reference by TCB 251*a*-251*b* to execute on slave processing cores 170.

FIG. 3 is a flowchart presenting a method of generating a task list comprising a plurality of transaction control blocks for execution on a multi-core system, according to one embodiment of the present invention. Certain details and features have been left out of flowchart 300 of FIG. 3 that are apparent to a person of ordinary skill in the art. For example, a step may consist of one or more sub-steps or may involve specialized equipment, as known in the art. While steps 310 through 350 shown in flowchart 300 are sufficient to describe one embodiment of the present invention, other embodiments of the invention may utilize steps different from those shown in flowchart 300.

Referring to step 310 of flowchart 300 in FIG. 3 and multi-core system 100 of FIG. 1, step 310 of flowchart 300 comprises processor 121 receiving input data 111. As previously discussed, processor 121 may use API 125*a* to allow application 115 executing on upper sub-system 110 to pass input data 111 for processing. Since input data 111 may be updated in real-time for real-time applications, processor 121 may receive a continuously updated stream of input data 111. After processing of some amount of input data 111 is finished, processor 121 may then provide the results back to application 115 via DAP 125*b* to fill output data 112.

Referring to step 320 of flowchart 300 in FIG. 3 and multi-core system 100 of FIG. 1, step 320 of flowchart 300 comprises processor 121 accessing sequential function list 116 constructed for execution on slave processing cores 170. As previously discussed, sequential function list 116 may be constructed, traced, and analyzed in advance for optimal execution on slave processing cores 170, with corresponding optimized execution templates stored in template database 131. Moreover, the contents of sequential function list 116 may vary depending on tasks appropriate for input data 111 received from step 310.

Referring to step 330 of flowchart 300 in FIG. 3, multi-core system 100 of FIG. 1, and diagram 200 of FIG. 2, step 330 of flowchart 300 comprises processor 121 selecting Function1 and Function2 from sequential function list 216 using Input1 and Input2 from input data 211 as function parameters. In other words, step 330 performs a data driven analysis as dictated by input data 211 to select required functions from sequential function list 216.

Referring to step 340 of flowchart 300 in FIG. 3, multi-core system 100 of FIG. 1, and diagram 200 of FIG. 2, step 340 of flowchart 300 comprises processor 121 translating Function1 and Function2 selected from step 330 into task list 250 comprising transaction control blocks 251*a*-251*b* for execution on multi-core system 100. As shown in FIG. 2, template matcher 230 may perform a lookup against template database 231 to find the closest matching template 232. As previously discussed, the template lookup may match against header descriptors such as input size, quantity, task type, and other criteria. Reference resolver 235 may then finalize template 232 by inserting data pointers and adding or removing TCBs as necessary. Additionally, tasks operating on common data may be consolidated into a larger task for execution on a single core and core local memory to reduce memory transfers and optimize for closest memory locality. Alternatively, as shown in FIG. 1, if no suitable template is found or if API 125*a* is explicitly called to perform full analysis, then task parallelism analyzer 140 may perform a full analysis to generate task list 250, corresponding to task list 150 in FIG. 1.

Referring to step 350 of flowchart 300 in FIG. 3 and multi-core system 100 of FIG. 1, step 350 of flowchart 300 comprises processor 121 forwarding task list 150 to scheduler 160 for execution on slave processing cores 170 of multi-core system 100. As task list 150 has already been pre-processed for optimal execution on slave processing cores 170, scheduler 160 may simply proceed as normal using parallel processing methods well known in the art. After processing of task list 150 is completed, the results may then exposed back to application 115 via DAP 125*b*, as indicated in FIG. 1. In this manner, highly optimized execution of applications on multi-core systems can be achieved while avoiding the processing penalty of full real-time analysis. Moreover, the programmer of application 115 is freed from the burden of having to explicitly generate task list 150 to achieve high levels of parallelism on slave processing cores 170.

From the above description of the embodiments of the present invention, it is manifest that various techniques can be used for implementing the concepts of the present invention without departing from its scope. Moreover, while the present invention has been described with specific reference to certain embodiments, a person of ordinary skill in the art would recognize that changes can be made in form and detail without departing from the spirit and the scope of the invention. It should also be understood that the invention is not limited to the particular embodiments described herein, but is capable of many rearrangements, modifications, and substitutions without departing from the scope of the invention.

What is claimed is:

1. A method of generating a task list comprising a plurality of transaction control blocks for execution on a multi-core system, the method comprising:
 receiving input data;
 accessing a sequential list of functions constructed for execution on a plurality of slave processing cores;
 selecting a subset of functions from said sequential list of functions, said subset of functions using said input data as function parameters;
 translating said subset of functions into said task list, wherein said translating includes:
  searching in a template database to find a template of said task list corresponding to said subset of functions; and
  if the searching is unable to find the template, analyzing said task list for parallel processing of said subset of functions on a plurality of slave processing cores of said multi-core system to create the template for parallel execution of said subset of functions and storing the template in the database;
 forwarding, after said translating, said task list having said subset of functions to a scheduler for parallel execution on said plurality of slave processing cores of said multi-core system.

2. The method of claim 1, wherein said translating uses metadata of said subset of functions to retrieve said template of said task list, wherein said template is optimized for said scheduler to efficiently distribute said task list for parallel execution on said plurality of slave processing cores.

3. The method of claim 2, wherein said template comprises transaction control blocks with empty data pointers.

4. The method of claim 3 further comprising, prior to said forwarding, resolving references of said subset of functions to finalize said empty data pointers.

5. The method of claim 2 further comprising, prior to said forwarding, inserting additional transaction control blocks to said task list.

6. The method of claim 2 further comprising, prior to said forwarding, removing transaction control blocks from said task list.

7. The method of claim 2, wherein said metadata includes a high-level task parameter.

8. The method of claim 1, wherein said translating analyzes data dependencies of said subset of functions to generate said task list.

9. The method of claim 1, wherein said input data is updated in real-time.

10. The method of claim 1 further comprising, prior to said forwarding, consolidating one or more groups of transaction control blocks using data dependencies to reduce a number of transfers between core local memory of said plurality of slave processing cores and a memory of said multi-core system.

11. A multi-core system comprising:
a lower sub-system including a processor, a scheduler, and a plurality of slave processing cores, said processor configured to:
receive input data;
access a sequential list of functions constructed for execution on said plurality of slave processing cores;
select a subset of functions from said sequential list of functions, said subset of functions using said input data as function parameters;
translate said subset of functions into a task list comprising a plurality of transaction control blocks, wherein said translating includes:
searching in a template database to find a template of said task list corresponding to said subset of functions; and
if the searching is unable to find the template, analyzing said task list for parallel processing of said subset of functions on said plurality of slave processing cores to create the template for parallel execution of said subset of functions and storing the template in the database;
forward, after translating, said task list having said subset of functions to said scheduler for parallel execution on said plurality of slave processing cores.

12. The system of claim 11, wherein the processor is further configured to use metadata of said subset of functions to retrieve said template of said task list, wherein said template is optimized, for said scheduler to efficiently distribute said task list for parallel execution on said plurality of slave processing cores.

13. The system of claim 12, wherein said template comprises transaction control blocks with empty data pointers.

14. The system of claim 13, wherein prior to said forwarding, the processor is further configured to resolve references of said subset of functions to finalize said empty data pointers.

15. The system of claim 12, wherein prior to said forwarding, the processor is further configured to insert additional transaction control blocks to said task list.

16. The system of claim 12 wherein prior to said forwarding, the processor is further configured to remove transaction control blocks from said task list.

17. The system of claim 12, wherein said metadata includes a high-level task parameter.

18. The system of claim 11, wherein said translating analyzes data dependencies of said subset of functions to generate said task list.

19. The system of claim 11, wherein said input data is updated in real-time.

20. The system of claim 11 wherein prior to said forwarding, the processor is further configured to consolidate one or more groups of transaction control blocks using data dependencies to reduce a number of transfers between core local memory of said plurality of slave processing cores and a memory of said multi-core system.

* * * * *